June 20, 1967    E. J. JOHNSTON    3,325,878
REINFORCED HAY CONDITIONER ROLLS
Filed July 15, 1965
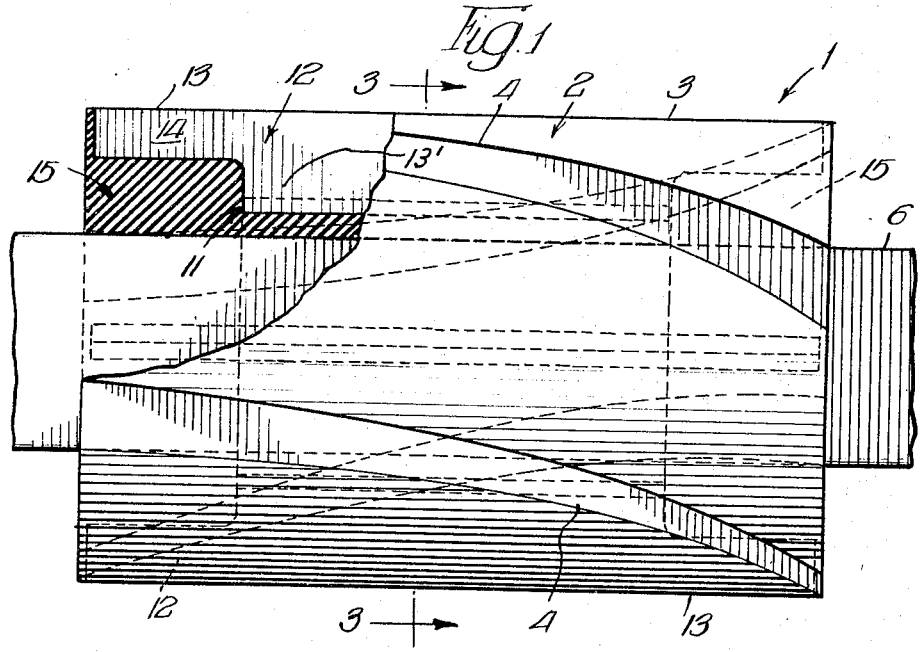
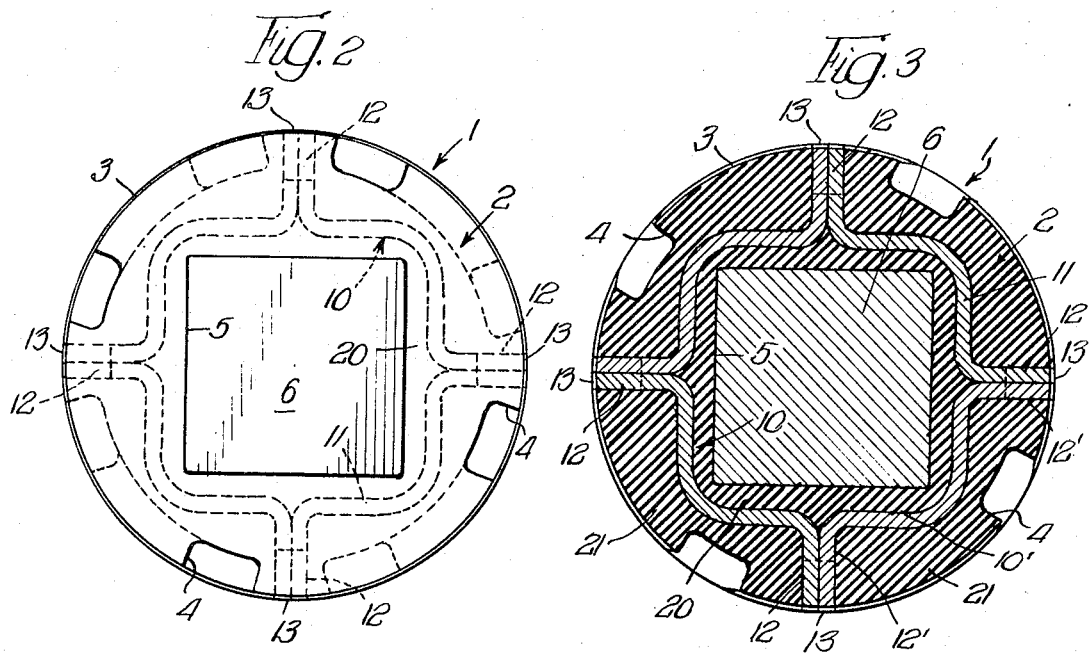
Inventor:
Edward J. Johnston,
John J. Kowalik
atty

United States Patent Office 3,325,878
Patented June 20, 1967

3,325,878
REINFORCED HAY CONDITIONER ROLLS
Edward J. Johnston, La Grange, Ill., assignor to International Harvester Company, Chicago, Ill., a corporation of Delaware
Filed July 15, 1965, Ser. No. 472,105
5 Claims. (Cl. 29—121)

This invention generally relates to an improved hay conditioner roller, and more particularly relates to a reinforced roller section suitable for use in the hay crushing mechanism as disclosed in pending application Ser. No. 315,869 filed Oct. 14, 1963, now Patent No. 3,210,825 which issued Oct. 12, 1965, for hay crushing rolls having long substantially cylindrical sections.

The above-mentioned patent application discloses and claims a hay crusher or conditioner mechanism in which the crushing rolls comprise a plurality of cylindrical or frusto-conical roll sections of solid molded elastomeric material mounted axially in an abutting relationship upon a central roller shaft. The elastomeric material from which these roller sections are made is fiber-impregnated, and preferably between 85 to 95 durometer so that the roller sections provide a flexible rolling surface which sheds moisture, thereby preventing the hay or other grass material from diminishing the effectiveness of the crushing mechanism by adhering to and wrapping around the rollers.

As further disclosed in the above-identified pending application, the peripheral rolling surface of these roller sections may be provided with a series of spiral grooves, preferably spaced ninety degrees apart, to assure that the rollers will grip the hay or other grass during the crushing or conditioning operation. A plurality of these above-described roller sections sleeved into closely abutting relationship onto a central rolling shaft provides a uniform hay crushing roller which can be easily and economically assembled, and which operates efficiently and effectively.

In accordance with this invention, it has been found that the effectiveness of such solid elastomer roller sections will be further enhanced, and their useful service life prolonged by providing the roller section with a metallic core insert to substantially reinforce and strengthen the roller. In particular, it has been found that the provision in the roller section of a metal core insert which has flanges extending to the periphery of the section greatly improves the wearing resistance of the peripheral rolling surface of the section by providing metal wear-resistant edge portions engageable with the hay or other grass being crushed and affords a good interlock between the insert and the section such that the two will not separate in the severe use to which such rollers are subjected.

It is therefore the principal object of this invention to provide an improved and reinforced roller for crushing or conditioning hay or the like.

It is an additional object of this invention to reinforce a roller section of a hay crushing roller by providing the roller section with a metallic core insert wherein portions of the insert serve to interlock the insert with the non-metallic roller section and also reinforce the roller section and further enhance the ability of the section to pick hay from the field.

It is a still further object of this invention to reinforce a roller section of a hay crushing roller with a metallic core insert which includes flanges providing the peripheral rolling surface of the roller section with metallic wear-resistant edge portions to prevent excessive surface wear.

More specific objects and features of this invention will become apparent from a description of an embodiment thereof, as illustrated in the accompanying drawings. In these drawings:

FIGURE 1 is a side elevational view in partial section of a roller section in accordance with this invention;

FIGURE 2 is an end view of the roller section illustrated in FIGURE 1, and

FIGURE 3 is a cross-sectional view taken along the line 3—3 in FIGURE 1.

Referring initially to FIGURE 1, the grass conditioner roller section 1 includes a cylindrical or slightly frusto-conical body 2 of elastomeric material, such as fiber-impregnated rubber, preferably of between 85 and 95 durometer. As also seen in FIGURE 1, this body 2 defines the peripheral rolling surface 3 of the roller section 1, and may be provided with a series of spiral or helical grooves 4, spaced approximately ninety degrees apart, which improve the gripping ability of the roller section. FIGURE 2 clearly illustrates that this body 2 is further provided with an axial opening 5 designed to receive the central shaft 6 of the hay conditioning or crushing mechanism. As described in more detail in the above-identified patent application, the rollers in the crushing mechanism may comprise a series of roller sections, similar to roller section 1, sleeved together on the central shaft 6. Hence, it is preferred that the axial opening 5 in the elastomeric material forming body 2 be non-round so that the section 1 will not rotate or slide with respect to adjacent roller sections on this central shaft.

In accordance with this invention, this substantially cylindrical roller section 1 is reinforced and strengthened by providing a metallic core insert 10 within the elastomeric material of body 2. As clearly illustrated in FIGURES 2 and 3, metallic insert 10 in this embodiment comprises an elongate metal tube 11 confined axially within the substantially cylindrical body 2 below the peripheral rolling surface 3 of the body. In the preferred embodiment of this invention, this metal tube 11 is confined within the body 2 outwardly from the opening 5 so that the body 2 thus provides an inner body portion 20 of elastomeric material within the tube 11 and an outer body portion 21 of elastomeric material surrounding the tube. As shown in FIGURE 3, the opening 5 is extended through this inner body portion 20. By this arrangement, the roller section 1 will be securely held in the proper position on the central shaft 6 by the engagement between the shaft and the elastomeric material surrounding opening 5.

Core insert 10 further includes a plurality of flanges 12 confined within the elastomeric material of body 2 and extending outwardly from the tube 11 toward the peripheral rolling surface 3. As illustrated in the drawings, these flanges 12 are preferably spaced uniformly within the body 2 approximately 90° apart and extend radially from the tube 11, thereby providing the elastomeric rolling surface 3 with arcuate metal wear-resistant material-engaging edge portions 13. FIGURE 1 shows that each of the flanges 12 may be formed from a continuous metal member having an inner portion 13' of limited axial dimensions and an outer portion 14, of a larger axial dimension, so that outer portion 14 extends along substantially the whole axial length of the roller section 1. The axial end of each flange 12 thus provides a cavity 15 which facilitates the bonding of the elastomeric material to the core insert.

As shown in FIGURE 3, this metallic core insert 10 may be easily formed by welding four steel W-like members 10' together at the flange portions 12' of the members. The core insert 10 may then be confined within the elastomeric material of the body 2 by bonding the elastomeric material forming inner body portion 20 and outer body portion 21 to the core insert 10 by any suitable bonding method.

From the above description of this invention, it is apparent that the core insert 10 greatly increases the strength of the elastomeric roller section 1 by providing a metallic reinforcement within the elastomeric material. It is further apparent from the above description that the flanges 12 of the core insert 10 prevent excessive wear of the peripheral rolling surface 3 of the roller by providing this elastomeric surface with metal wear-resistant edge portions 13. In accordance with this invention, the metallic portions 13 prevent the build-up of excessive frictional heat on the surface of the roller section by limiting deflection of the elastomeric material, and prevent abrasion damage to the surface of the elastomeric rollers during the hay crushing operation as when the crop material slips upon such surface. This invention therefore eliminates the degradation of the elastomeric rollers by heat and abrasion which heretofore occurred when the hay crushing mechanism was used on grass where slippage occurred.

Since the possibility of damage to the rolls by abrasion and heat is maximum at the outer ends of the crushing rolls, where the hay or the like may be caught in the side supports of the roll carrier and thus prevented from being pulled completely through the crushing rolls, it has been found to be particularly effective to mount the reinforced roller sections of this invention on the end portions of the rollers in the hay crushing mechanism. The metal inserts obtain a positive grip on the material and thus pull it through the rollers.

As hereintofore mentioned, the reinforced roller sections of this invention may be cylindrical or frusto-conical. However, since the degree of taper of the frusto-conical roller sections is preferably slight, it is intended that both forms of the roller section be defined as substantially cylindrical.

It should be understood that the foregoing is merely illustrative of an embodiment of this invention. Various modifications in the structural and functional features of this reinforced roller section may be devised by those skilled in the art without departing from the scope of this invention, as set forth in the accompanying claims.

What is claimed is:
1. A reinforced roller section for a hay conditioner comprising
  a substantially cylindrical body of elastomeric material including an axial opening to receive a central roller shaft, and
  a core insert comprising an elongate metal tube confined axially within said elastomeric material below the peripheral rolling surface of said body, said core insert including a plurality of flanges extending outwardly from said tube through said elastomeric material with each of said flanges extending along substantially the axial length of said body and terminating adjacent to the peripheral rolling surface of said body to provide said rolling surface with metal hay engaging portions, and said elastomeric material having a section within said tube for mounting directly on said central roller shaft for accommodating radial inward movement of said core insert.

2. A reinforced roller section according to claim 1 wherein said elastomeric material comprises fiber-impregnated rubber of approximately 85 to 95 durometer.

3. A reinforced roller section according to claim 1 wherein said peripheral rolling surface of said body includes helical grooves to improve the gripping action of said surface.

4. A reinforced roller section according to claim 1 wherein said flanges of said core insert extend radially toward said peripheral rolling surface and are spaced approximately ninety degrees apart to provide uniformly spaced metal edge portions on said peripheral rolling surface.

5. The invention accordings to claim 1 and said core insert bonded within the body and said tube having axially spaced ends spaced inwardly from corresponding axial ends of said body.

References Cited
UNITED STATES PATENTS

| | | | |
|---|---|---|---|
| 2,257,025 | 9/1941 | Schuster | 29—123 X |
| 2,352,501 | 6/1944 | Slavicek. | |
| 2,469,687 | 5/1949 | Fergason | 130—5 |
| 2,538,965 | 1/1951 | Fergason | 29—121 X |
| 2,610,633 | 9/1952 | Jozwik. | |
| 2,801,461 | 8/1957 | Kusters | 29—120 |
| 3,101,720 | 8/1963 | Karlsson | 29—121 X |
| 3,103,240 | 9/1963 | Minera | 146—55 |
| 3,054,163 | 9/1962 | Lakin. | |

BILLY J. WILHITE, Primary Examiner.